United States Patent
Cheng et al.

(10) Patent No.: US 9,528,907 B2
(45) Date of Patent: Dec. 27, 2016

(54) METHOD AND DEVICE FOR DETECTING SYMMETRY OF OPTICAL FIBER

(71) Applicant: Huawei Technologies Co., Ltd., Shenzhen, Guangdong (CN)

(72) Inventors: Yong Cheng, Shenzhen (CN); Wei Wei, Shenzhen (CN); Yong Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 69 days.

(21) Appl. No.: 14/334,320

(22) Filed: Jul. 17, 2014

(65) Prior Publication Data

US 2014/0347652 A1  Nov. 27, 2014

Related U.S. Application Data

(63) Continuation of application No. PCT/CN2012/079550, filed on Aug. 2, 2012.

(30) Foreign Application Priority Data

Jan. 17, 2012  (CN) .......................... 2012 1 0014084

(51) Int. Cl.
*G01M 11/00* (2006.01)
*H04J 3/06* (2006.01)
(Continued)

(52) U.S. Cl.
CPC .......... *G01M 11/30* (2013.01); *H04B 10/0773* (2013.01); *H04J 3/0673* (2013.01); *H04J 3/14* (2013.01)

(58) Field of Classification Search
None
See application file for complete search history.

(56) References Cited

U.S. PATENT DOCUMENTS 8,416,812 B2 * 4/2013 Radulescu ............ H04J 3/0667
370/503
9,166,681 B2 * 10/2015 Cavaliere ............... H04B 10/07
(Continued)

FOREIGN PATENT DOCUMENTS

CN  1794655 A  6/2006
CN  1885987 A  12/2006
(Continued)

OTHER PUBLICATIONS

IEEE, "IEEE Standard for a Precision Clock Synchronization Protocol for Networked Measurement and Control", Jul. 24, 2008, IEEE Std 1588-2008, pp. 1-269.*

(Continued)

*Primary Examiner* — Robert C Scheibel
(74) *Attorney, Agent, or Firm* — Leydig, Voit & Mayer, Ltd.

(57) ABSTRACT

A method for detecting symmetry of optical fibers and a device thereof are provided. The method includes: receiving, by a boundary clock, a first timestamp message carrying a first timestamp via a slave port, and a second timestamp message carrying a second timestamp via a passive port; and determining, by the boundary clock, symmetry of optical fibers according to at least the first timestamp and the second timestamp. The method and device for detecting symmetry of optical fibers provided by the present disclosure reduce the cost of detecting symmetry of optical fibers in the conventional technology, and improve the efficiency of detecting symmetry of optical fibers in the conventional technology.

7 Claims, 3 Drawing Sheets

(51) Int. Cl.
*H04J 3/14* (2006.01)
*H04B 10/077* (2013.01)

(56) References Cited

U.S. PATENT DOCUMENTS

| | | | |
|---|---|---|---|
| 9,300,422 B2* | 3/2016 | Le Pallec | H04J 3/14 |
| 2007/0147562 A1* | 6/2007 | Eidson | H04J 3/0667 375/354 |
| 2009/0013330 A1 | 1/2009 | Gotz et al. | |
| 2009/0161744 A1* | 6/2009 | Smith | H04B 3/462 375/226 |
| 2011/0122775 A1* | 5/2011 | Zampetti | H04J 3/0641 370/242 |
| 2011/0262133 A1* | 10/2011 | Yuan | H04J 3/0667 398/43 |

FOREIGN PATENT DOCUMENTS

| | | |
|---|---|---|
| CN | 101499871 A | 8/2009 |
| CN | 101771467 A | 7/2010 |
| CN | 101771487 A | 7/2010 |
| CN | 102148652 A | 8/2011 |
| CN | 102291178 A | 12/2011 |
| CN | 102291196 A | 12/2011 |
| CN | 102546009 A | 7/2012 |
| WO | WO 2011085585 A1 | 7/2011 |
| WO | WO 2012048975 A1 | 4/2012 |

OTHER PUBLICATIONS

"Draft Standard for a Precision Clock Synchronization Protocol for Networked Measurement and Control Systems," IEEE P1588 D2.2, pp. 1-287, Institute of Electrical and Electronics Engineers, New York, New York (Dec. 18, 2007).

Meier et al., "IEEE 1588 applied in the environment of high availability LANs," 2007 International IEEE Symposium on Precision Clock Synchronization for Measurement, Control and Communication, Vienna, Austria, pp. 100-104, Institute of Electrical and Electronics Engineers, New York, New York (Oct. 1-3, 2007).

* cited by examiner

METHOD AND DEVICE FOR DETECTING SYMMETRY OF OPTICAL FIBER

CROSS-REFERENCE TO RELATED APPLICATIONS

This application is a continuation of International Patent Application No. PCT/CN2012/079550, filed on Aug. 2, 2012, which claims priority to Chinese Patent Application No. 201210014084.5, filed on Jan. 17, 2012, both of which are hereby incorporated by reference in their entireties.

TECHNICAL FIELD

The present disclosure relates to the field of communications technologies, and in particular to a method for detecting symmetry of optical fibers and a device thereof.

BACKGROUND

With the development of $3^{rd}$ generation mobile telecommunications (3G) technology/the long term evolution (LTE) technology, a higher requirement of time synchronization performance for communication network is desirable. There are some problems in the existing global positioning system (GPS) for time synchronization, such as the difficulties in location for installation, maintenance and laying feeder cable, and the high safety hazard and cost, hence how to realize a high-accuracy ground time synchronization is very important.

1588V2 high-accuracy time-recovery technology comes into being under the requirement for the high-accuracy ground time synchronization. The 1588V2 high-accuracy time-recovery technology is realized basing on the symmetry of the back-and-forth optical fiber links (hereinafter referred to as symmetry of optical fibers). In the process of cutting in and maintaining a network, the slight asymmetry of the back-and-forth optical fiber links (hereinafter referred to as symmetry of optical fibers) may be introduced, hence there may occur error and effect accuracy if employing the 1588V2 high-accuracy time-recovery technology. Therefore, the detection of symmetry of optical fibers affects the accuracy of the 1588V2 high-accuracy time-recovery technology.

At present, the detection for the symmetry of the optical fiber in network is mainly implemented manually, thereby producing a high manual maintenance cost and a long positioning time. In addition, once asymmetry of optical fibers occurs in the network, a long-time detection caused accordingly may affect the service.

SUMMARY

In view of this, a method for detecting symmetry of optical fibers and a device thereof are provided in this disclosure, where the cost of detecting the symmetry of the optical fibers may be reduced, and efficiency of detecting the symmetry of optical fibers may be improved.

Firstly, a method for detecting symmetry of optical fibers is provided, including:

receiving, by a boundary clock, a first timestamp message carrying a first timestamp via a slave port, and a second timestamp message carrying a second timestamp via a passive port; and determining, by the boundary clock, symmetry of optical fibers according to at least the first timestamp and the second timestamp.

Secondly, a device for detecting symmetry of optical fibers is provided, including:

a receiving module, configured to receive a first timestamp message carrying a first timestamp via a slave port, and to receive a second timestamp message carrying a second timestamp via a passive port; and a determining module, configured to determine symmetry of optical fibers according to at least the first timestamp and the second timestamp.

According to the method and device for detecting symmetry of optical fibers provided in the embodiments of the disclosure, the symmetry of optical fibers is determined according to the first timestamp received by the slave port and the second timestamp received by the passive port, hence it may be monitored in real time whether there is any asymmetric optical fiber link in the current network, and the detection efficiency may be improved and the maintenance cost may be reduced.

BRIEF DESCRIPTION OF THE DRAWINGS

In order to clarify the technical solutions in the embodiments of the disclosure or in the conventional technology, the attached drawing may be briefly introduced in the following. Obviously, the drawings to be described in the following are only part of the embodiments, and those skilled in the art may further obtain other drawings according to these drawings without creative work.

DETAILED DESCRIPTION

The technical solutions according to the embodiments of the present application will be described in more details in conjunction with the attached drawings, to make the solutions better understood by those skilled in the art. The disclosed embodiments are only the preferable implementations of the disclosure and the disclosure is not meant to be limited to these embodiments. The improvements or changes to the embodiments based on the spirit of the disclosure are available.

Figure 1:
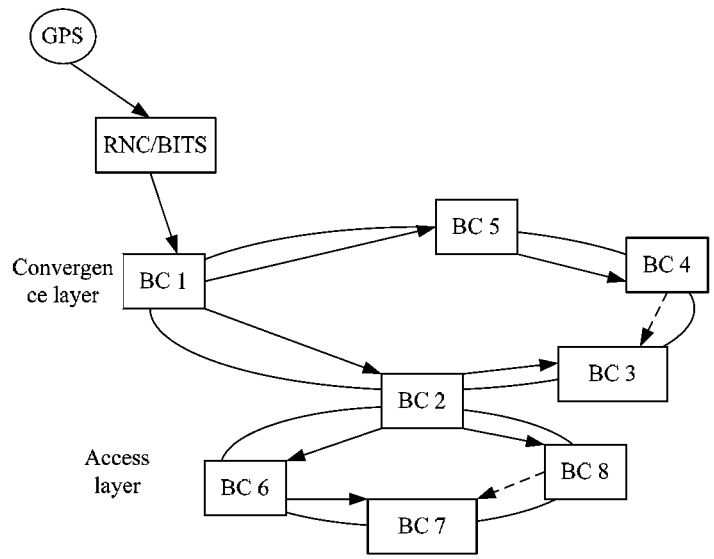
FIG. 1 is a structure diagram of a typical network for clock synchronization.

FIG. 1 is a structure diagram of a typical network for clock synchronization. A boundary clock (BC) has multiple ports for time synchronization, where the BC is configured to receive a synchronous time from an upstream clock node via one of the ports, and to release the synchronous time to a downstream clock node via the other ports. In the conventional technology, the ports of the BC includes:

a master port, configured to release a synchronous time;

a slave port, configured to receive the synchronous time;

a passive port which is a backup port for the slave port. In the case that the slave port is switched off, the passive port may act as a slave port; in the case that the slave port runs normally, the passive port may neither receive the synchronous time nor release the synchronous time.

Compared with the conventional technology, in the embodiments of the disclosure, the passive port may receive the synchronous time in the case that the slave port runs normally, for instance, which may be achieved by changing the conditions for sending and receiving timestamp message in protocol, or writing the passive port as a slave port.

Embodiment 1

Figure 2:
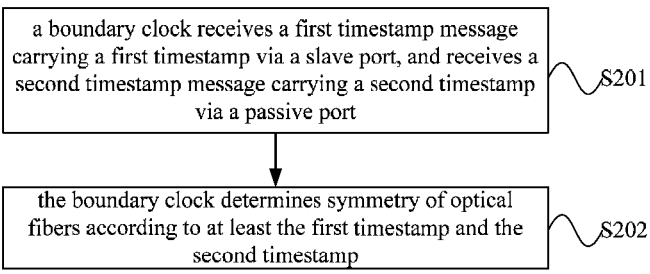
FIG. 2 is a schematic flow diagram of a method for detecting symmetry of optical fibers according to embodiment 1 of the disclosure.

FIG. 2 is a schematic flow diagram of a method for detecting symmetry of optical fibers according to the embodiment 1 of the disclosure. As shown in FIG. 2, the method includes:

S201, a boundary clock receives a first timestamp message carrying a first timestamp via a slave port, and receives a second timestamp message carrying a second timestamp via a passive port.

S202, the boundary clock determines symmetry of optical fibers according to at least the first timestamp and the second timestamp.

Alternatively, the process that the boundary clock determines the symmetry of the optical fibers according to at least the first timestamp and the second timestamp may include: the boundary clock compares the first timestamp with the second timestamp; if a difference value between the first timestamp and the second timestamp is larger than a first preset value, the boundary clock determines that the optical fibers are not symmetric.

Alternatively, the process that the boundary clock compares the first timestamp and the second timestamp may include: the boundary clock calculates a first time offset between the boundary clock and a node sending the first timestamp message according to the first timestamp; the boundary clock calculates a second time offset between the boundary clock and a node sending the second timestamp message according to the second timestamp; the boundary clock compares the first time offset with the second time offset, where a difference value between the first time offset and the second time offset is the difference value between the first timestamp and the second timestamp.

Alternatively, if it is determined that the optical fibers are not symmetric, an alarm may be generated and sent to administrator.

Taking the scenario in FIG. 1 for example, the embodiment 1 of the disclosure may be further specified. As shown in the scenario in FIG. 1, BC1, BC2 and BC3 compose a primary path, and BC1, BC5, BC4 and BC3 compose a backup path. If the primary path malfunctions, the backup path may act as a primary path; hence the reliability of network may be enhanced. BC3 includes a slave port and a passive port.

BC1 receives a standard time from a GPS source via a radio network controller (RNC) or a background intelligent transfer service (BITS). And BC1 sends a timestamp message to BC2 and BC5, where the timestamp message carries the time at which BC1 sends the timestamp message as the timestamp (timestamp A).

On receiving the message, BC2 may reset a timestamp (timestamp B) according to timestamp A carried in the timestamp message and a delay time between BC1 and BC2, and send a timestamp message (hereinafter referred as a first timestamp message) which carries timestamp B to BC3. The first timestamp message includes a sync message and a delay message of 1588 protocol, where the delay message is a Delay_Resp message sent from BC2 to BC3. Timestamp B includes timestamp B1 carried in the sync message and timestamp B2 carried in the Delay_Resp message.

Similarly, BC5 and BC4 may reset the timestamp in a way above according to the timestamp message sent by an upstream node. In the scenario in FIG. 1, BC4 may send a timestamp message (hereinafter referred as a second timestamp message) which carries timestamp C to BC3. The second time stamp message includes a sync message and a delay message of 1588 protocol, where the delay message is a Delay_Resp message sent from BC4 to BC3. Timestamp C includes timestamp C1 carried in the sync message and timestamp C2 carried in the Delay_Resp message.

BC3 receives the first timestamp message via the slave port, receives the second timestamp message via the passive port, and compares timestamp B carried in the first timestamp message with timestamp C carried in the second timestamp message. For example, a first time offset (offset 1) between BC3 and BC2 is calculated according to timestamp B, and a second time offset (offset 2) between BC3 and BC4 is calculated according to timestamp C; it is compared offset 1 with offset 2; if a difference value between offset 1 and offset 2 exceeds a preset tolerable error value, an alarm may be sent out.

Alternatively, the values of the first time offset and the second time offset may be obtained according to the synchronization principle of End to End model.

Figure 3:
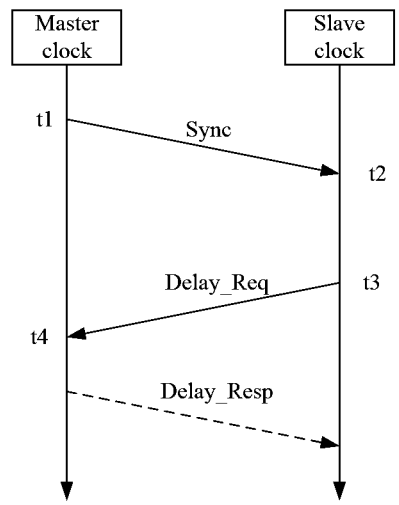
FIG. 3 is a schematic diagram of the synchronization principle of E2E model.

FIG. 3 is a schematic diagram of the synchronization principle of E2E model. As shown in FIG. 3, a time offset between the master clock and the slave clock is $[((t2-t1)-(t4-t3))/2]+[(Delay1-Delay2)/2]$, where Delay 1 is transmission delay time from a master device to a slave device, and Delay 2 is transmission delay time from the slave device to the master device. $t1$ is an instant when the master device sends a sync message to the slave device; $t2$ is an instant when the slave device receives the sync message; $t3$ is an instant when the slave device sends a delay request message (Delay_Req) to the master device; $t4$ is an instant when the master device receives the Delay_Req.

$t1$, i.e., timestamp B1 or C1 mentioned above, is carried in the sync message sent from the master device to the slave device; $t4$, i.e., timestamp B2 or C2 mentioned above, is carried in the delay response message (Delay_Resp). $t2$ and $t3$ may be obtained from the slave device itself; hence the time offset between the master clock and the slave clock may be obtained by sending and receiving the sync message and the delay message (including the delay request message and the delay response message) between the master device and the slave device. The master clock and the slave clock, as well as the master device and the slave device, are both relative. For example, in the case that offset 1 between BC3 and BC2 is calculated, BC3 is synchronized by BC2, hence BC2 is a master device and the clock of BC2 is a master clock, and BC3 is a slave device and the clock of BC3 is a slave clock. Similarly, in the case that offset 2 between BC3 and BC4 is calculated, BC3 is synchronized by BC4, hence BC4 is a master device and the clock of BC4 is a master clock, and BC3 is a slave device and the clock of BC3 is a slave clock.

According to the method for detecting symmetry of optical fibers in embodiment 1, the symmetry of the optical fibers is determined according to the first timestamp received by the slave port and the second timestamp received by the passive port, hence it may be monitored in real time whether there is any asymmetric optical fiber link in the current network, an accurate offset may be obtained, and the detection efficiency may be improved and the maintenance cost may be reduced.

Embodiment 2

Alternatively, the S202 mentioned above may further include:

the boundary clock determines the symmetry of the optical fibers according to the first timestamp, the second timestamp and a standard time provided by a GPS source.

Alternatively, the process that the boundary clock determines the symmetry of optical fibers according to the first timestamp, the second timestamp and the standard time provided by the GPS source may include: the boundary clock compares the first timestamp with the second timestamp, and compares the first timestamp with the standard time provided by the GPS source; if the difference value between the first timestamp and the second timestamp, and the difference value between the first timestamp and the standard time provided by the GPS source are both larger than a second preset value, the boundary clock determines that the optical fibers are not symmetric.

Figure 4:
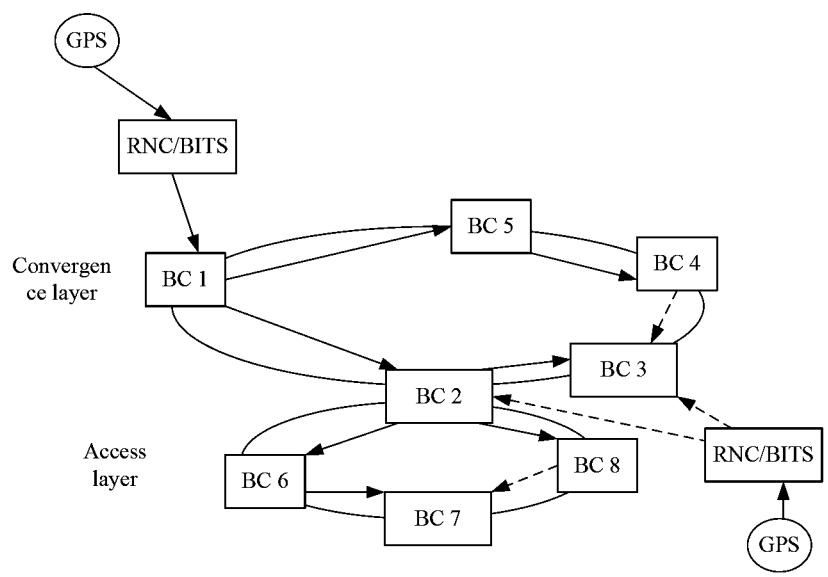
FIG. 4 is an architecture diagram of a network for achieving a method for detecting the symmetry of an optical fiber sending-receiving link according to embodiment 2 of the disclosure.

As shown in FIG. 4, if the primary path and the backup path both malfunction, the errors introduced due to the asymmetry of optical fibers may be offset. In the case that BC3 is additionally introduced with one or multiple GPS sources, BC3 may obtain the difference value between the first timestamp and the second timestamp, as well as the difference value between the first timestamp and the standard time provided by the GPS source, thereby further improving the accuracy of detecting the symmetry of optical fibers.

Embodiment 3

Figure 5:
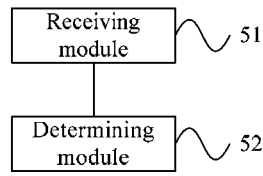
FIG. 5 is a schematic structure diagram of a device for detecting symmetry of an optical fiber sending-receiving link according to embodiment 3 of the disclosure.

FIG. 5 is a schematic structure diagram of a device for detecting symmetry of optical fibers provided according to embodiment 3 of the disclosure. The device includes:

a receiving module 51, configured to receive a first timestamp message carrying a first timestamp via a slave port, and to receive a second timestamp message carrying a second timestamp via a passive port; and a determining module 52, configured to determine the symmetry of the optical fibers according to at least the first timestamp and the second timestamp.

Figure 6:
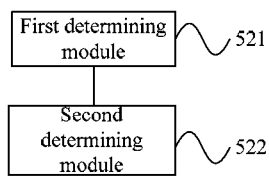
FIG. 6 is a schematic structure diagram of a determining module of the device for detecting symmetry of optical fibers according to the embodiment 3 of the disclosure.

Alternatively, FIG. 6 is a schematic structure diagram of a determining module of the device for detecting symmetry of optical fibers according to embodiment 3 of the disclosure. As shown in FIG. 6, the determining module 52 may include:

a first determining module 521, configured to compare the first timestamp with the second timestamp; and determine that the optical fibers are not symmetric, if a difference value between the first timestamp and the second timestamp is larger than a first preset value; and/or a second determining module 522, configured to compare the first timestamp with the second timestamp, and compares the first timestamp with a standard time provided by a GPS source; and determine that the optical fibers are not symmetric, if the difference value between the first timestamp and the second timestamp and a difference value between the first timestamp and the standard time provided by the GPS source are both larger than a second preset value.

Figure 7:
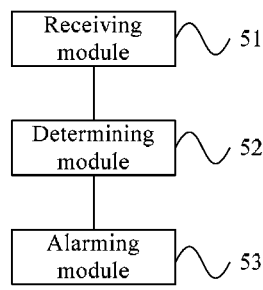
FIG. 7 is another schematic structure diagram of a device for detecting symmetry of optical fibers according to the embodiment 3 of the disclosure.

Alternatively, FIG. 7 is another schematic structure diagram of a device for detecting symmetry of optical fibers according to embodiment 3 of the disclosure. As shown in FIG. 7, the device may further include:

an alarming module 53, configured to generate and send an alarm to administrator if it is determined that the optical fibers are not symmetric.

The detecting method performed in the detecting device according to the embodiment 3 is the same as the method for detecting symmetry of optical fibers according to embodiment 1, hence it is unnecessary to go into details.

According to the device for detecting symmetry of optical fibers in embodiment 3, the symmetry of the optical fibers is determined according to the first timestamp received by the slave port and the second timestamp received by the passive port, hence it may be monitored in real time whether there is any asymmetric optical fiber link in the current network, an accurate offset may be obtained, and the detection efficiency may be improved and the maintenance cost may be reduced.

According to the foregoing description of the embodiments, those skilled in the art may understand clearly that the disclosure may be implemented by software and necessary general hardware or only by hardware; however, the former is preferable. Basing on that, the disclosure may be implemented by software product, where the software product may be stored in readable storage medium, such as floppy, hard disk or optical disk, including multiple instructions (personal computer, server or network device) to implement the methods in embodiments of the disclosure.

Lastly, it should be noted that, the above embodiments are only used to describe the technical solution of the disclosure and are not intended to define the disclosure. Although the disclosure is described in detail with the above embodiments, it should be apparent to those of ordinary skill in the art that modifications may be made to the technical solutions described in the above embodiments, or equivalent replacements may be performed on parts of technical features of the technical solutions. The modifications and replacement do not make the essence of the corresponding technical solution separate from the protection scope of the technical solutions in embodiments of the disclosure.

What is claimed is:

1. A method for detecting symmetry of optical fibers, performed by a boundary clock comprising a slave port and a passive port wherein the passive port is configured to run when the slave port runs normally;

wherein the method comprises:

receiving, by the boundary clock, a first timestamp message carrying a first timestamp via the slave port, and a second timestamp message carrying a second timestamp via the passive port, wherein the first timestamp message and the second timestamp message are sent by a first neighbor boundary clock and a second neighbor boundary clock of the boundary clock, respectively;

calculating, by the boundary clock, a first time offset between the boundary clock and the first neighbor boundary clock according to the first timestamp;

calculating, by the boundary clock, a second time offset between the boundary clock and the second neighbor boundary clock according to the second timestamp; and monitoring the optical fibers by comparing the first time offset and the second time offset, wherein the optical fibers are not symmetric if a difference value between the first time offset and the second time offset is larger than a first preset value.

2. The method according to claim 1, further comprising:
receiving, by the boundary clock, a standard time provided by a GPS source.

3. The method according to claim 2, further comprising:
calculating, by the boundary clock, a third time offset between the boundary clock and the GPS source according to the standard time; and
comparing, by the boundary clock, the first time offset and the third time offset; and
determining that the optical fibers are not symmetric, if a difference value between the first time offset and the second time offset and a difference value between the first time offset and the third time offset are both larger than a second preset value.

4. The method according to claim 1, wherein the boundary clock generates and sends an alarm to an administrator, if it is determined that the optical fibers are not symmetric.

5. A device for detecting symmetry of optical fibers in a communication network, wherein the device is a boundary clock comprising a slave port and a passive port, wherein the passive port is configured to run when the slave port runs normally, wherein the device further comprises a processor and a non-transitory processor-readable medium having processor-executable instructions stored thereon, and the instructions when executed by the processor, configure the device to:
receive a first timestamp message carrying a first timestamp via the slave port, and to receive a second timestamp message carrying a second timestamp via the passive port, wherein the first timestamp message and the second timestamp message are sent by a first neighbor boundary clock and a second neighbor boundary clock of the boundary clock respectively;
calculate a first time offset between the boundary clock and the first neighbor boundary clock according to the first timestamp;
calculate a second time offset between the boundary clock and the second neighbor boundary clock according to the second timestamp; and
monitor the optical fibers by comparing the first time offset and the second time offset, wherein the optical fibers are not symmetric if a difference value between the first time offset and the second time offset is larger than a first preset value.

6. The device according to claim 5, wherein the instructions further configure the device to:
receive a standard time provided by a GPS source;
calculate a third time offset between the boundary clock and the GPS source according to the standard time;
compare the first time offset and the third time offset; and
determine that the optical fibers are not symmetric, if a difference value between the first time offset and the second time offset and a difference value between the first time offset and the third time offset are both larger than a second preset value.

7. The device according to claim 5, wherein the device further comprises:
an alarming module, configured to generate and send an alarm to an administrator if it is determined that the optical fibers are not symmetric.

* * * * *